(12) United States Patent
Gade

(10) Patent No.: US 12,263,968 B1
(45) Date of Patent: Apr. 1, 2025

(54) CONNECTOR ASSEMBLY FOR A ROTOR

(71) Applicant: ideaForge Technology Limited, Maharashtra (IN)

(72) Inventor: Sachin Baban Gade, Maharashtra (IN)

(73) Assignee: ideaForge Technology Limited, Navi Mumbai (IN)

( * ) Notice: Subject to any disclaimer, the term of this patent is extended or adjusted under 35 U.S.C. 154(b) by 0 days.

(21) Appl. No.: 18/887,003

(22) Filed: Sep. 16, 2024

(30) Foreign Application Priority Data

Sep. 18, 2023 (IN) .............................. 202321062646

(51) Int. Cl.
  *B64U 30/29*  (2023.01)
(52) U.S. Cl.
  CPC .................................... *B64U 30/29* (2023.01)

(58) Field of Classification Search
  CPC ...... F04D 29/34; F04D 29/601; F04D 29/644; F04D 29/646; B64U 30/29
  See application file for complete search history.

*Primary Examiner* — Brian O Peters

(57) ABSTRACT

A connector assembly 100 for detachably coupling a propeller to a motor of an UAV includes a base portion 200 to be fixed to the motor and a holder 400 to be fixed to the corresponding propeller. The detachable coupling is facilitated by teeth 402 provided on the holder 400 and corresponding recesses 208 on base portion 200 such that when holder 400 is rotated after being placed over the base portion 200, the teeth 402 engage with the recesses 208. Holder 400 is locked against rotation after the teeth engage with recesses. An engaging plate 300 is provided to move between a pressed position and a released position and includes projections 302, which, in the released position of the engaging plate 300, engage with cavities 404 of holder 400, to lock the holder 400 against rotation.

9 Claims, 6 Drawing Sheets

CONNECTOR ASSEMBLY FOR A ROTOR

CROSS REFERENCE TO RELATED APPLICATIONS

The present application claims the benefit of Indian Patent Application number 202321062646 filed on Sep. 18, 2023, the contents of which are incorporated herein by reference in their entirety.

TECHNICAL FIELD

The present disclosure relates generally to the technical field of unmanned aerial vehicles. In particular, it pertains to assembly device for coupling and decoupling of a propeller unit from a motor of an unmanned aerial vehicle.

BACKGROUND

Background description includes information that may be useful in understanding the present disclosure. It is not an admission that any of the information provided herein is prior art or relevant to the presently claimed disclosure, or that any publication specifically or implicitly referenced is prior art.

Unmanned Aerial Vehicles, also commonly known as drones, are now being abundantly used for many applications, such as surveillance, mapping an area, farming, transporting parcels, carrying medical items and body parts, etc. They provide advantage of a quick completion of assigned tasks.

During execution of these roles, the UAVs are required to be transported from one place to other. Therefore, many UAVs are designed to be dismantlable to reduce their volume and make packaging easy. However, dismantling and assembling the UAV can be time consuming. To reduce the assembly and disassembly time, it would be advantageous if the coupling means for coupling different parts can be quick lock and release type.

A propeller of an UAV is an important part that directly affects airborne capabilities of the UAV. The propellers are conventionally mounted onto respective motors using screws and bolts, which can be time consuming and leaves room for error. For example, inadequately tightened hardware may loosen causing wobbly rotation of the propeller affecting its ability to provide the intended lift. In worst case scenario, the loosened fasteners may lead to detachment of the propeller from the motor causing the UAV to crash and, irreversible damage.

There is therefore a need in the art to provide an alternate mechanism for mounting the propellers with the respective motors. It would be further advantageous if the alternate mechanism is a quick lock and release mechanism that saves time and effort during assembling and disassembling the propellers.

OBJECTS OF THE INVENTION

A general object of the present disclosure is to ease assembly and disassembly of an unmanned aerial vehicle.

An object of the present invention is to provide a quick release device for ease of assembly and disassembly of propellers of an unmanned aerial vehicle.

Another object of the present invention is to provide a quick release device for propellers of unmanned aerial vehicles that is easy and quick to operate.

An object of the present disclosure is to provide a simple, efficient, and cost-effective quick release device that does not required any screw or bolts and specialised tools during assembly and disassembly of the propellers.

Another object of the present disclosure is to provide a quick release device with limited parts that does not require any specialised training to technician for coupling and decoupling of a propeller onto a motor of an unmanned aerial vehicle.

Yet another object of the present disclosure is to provide a quick release device for propellers that ensure proper alignment and a robust coupling of the propeller with the motor.

SUMMARY

Aspects of the present disclosure relate generally to the technical field of unmanned aerial vehicles. In particular, it pertains to a device for coupling and decoupling of a propeller unit (also referred to as connector assembly, herein) with the corresponding motor without fasteners, thereby ensuring quick assembly and disassembly.

In an aspect, the proposed connector assembly for a rotor includes a base portion configured to be fixed to a motor unit. The connector assembly further includes an engaging plate for movement between a pressed position and a released position, and is biased towards the released position. The engaging plate includes a plurality of projections, which, in the released position of the engaging plate, project out through a plurality of apertures in the base portion on an upper side of the base portion. The connector assembly further includes a holder that is fixed to a propeller.

In an aspect, the holder includes a plurality of teeth configured to engage with a plurality of recesses provided on the upper side of the base portion. When the holder along with the coupled propeller is rotated after being placed over the upper side of the base portion, the teeth engage with the recesses of the base portion. The holder includes a plurality of cavities that engage with the projections of the engaging plate that project out from the upper side of the base portion on the engaging plate moving to the released position. The engagement of the projections with the cavities prevents rotation of the holder after the teeth of the holder have engaged with the recesses of the base portion.

In an embodiment, the base portion may include housing and a top plate fixed to an upper side of the housing such that the housing and the top plate together define an inner hollow for accommodating the engaging plate.

In an embodiment, the apertures may be provided on the top plate.

In an embodiment, the projections of the engaging plate may be configured such that, when the engaging plate is moved to the pressed position, the plurality of projections are withdrawn within the corresponding apertures to allow the holder to be rotated after being placed over the top plate.

In an embodiment, the engaging plate may include a pair of push bars. The push bars may extend radially out of the base portion through corresponding cut-outs in the housing below the top plate. This enables the push bars to be accessible for use, such as by pushing them down, for moving of the engaging plate to the pressed position.

In an embodiment, the engaging plate may be biased by one or more springs configured between the housing and the engaging plate.

In an embodiment, the recesses for engagement of teeth of the holder may be provided on the top plate.

In an embodiment, the top plate may be fixed to the housing by screws.

In an embodiment, the holder and the base portion may include holes for fixing a screw there-through as an additional locking between the base portion and the holder.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure.

DETAILED DESCRIPTION

Figure 1A:
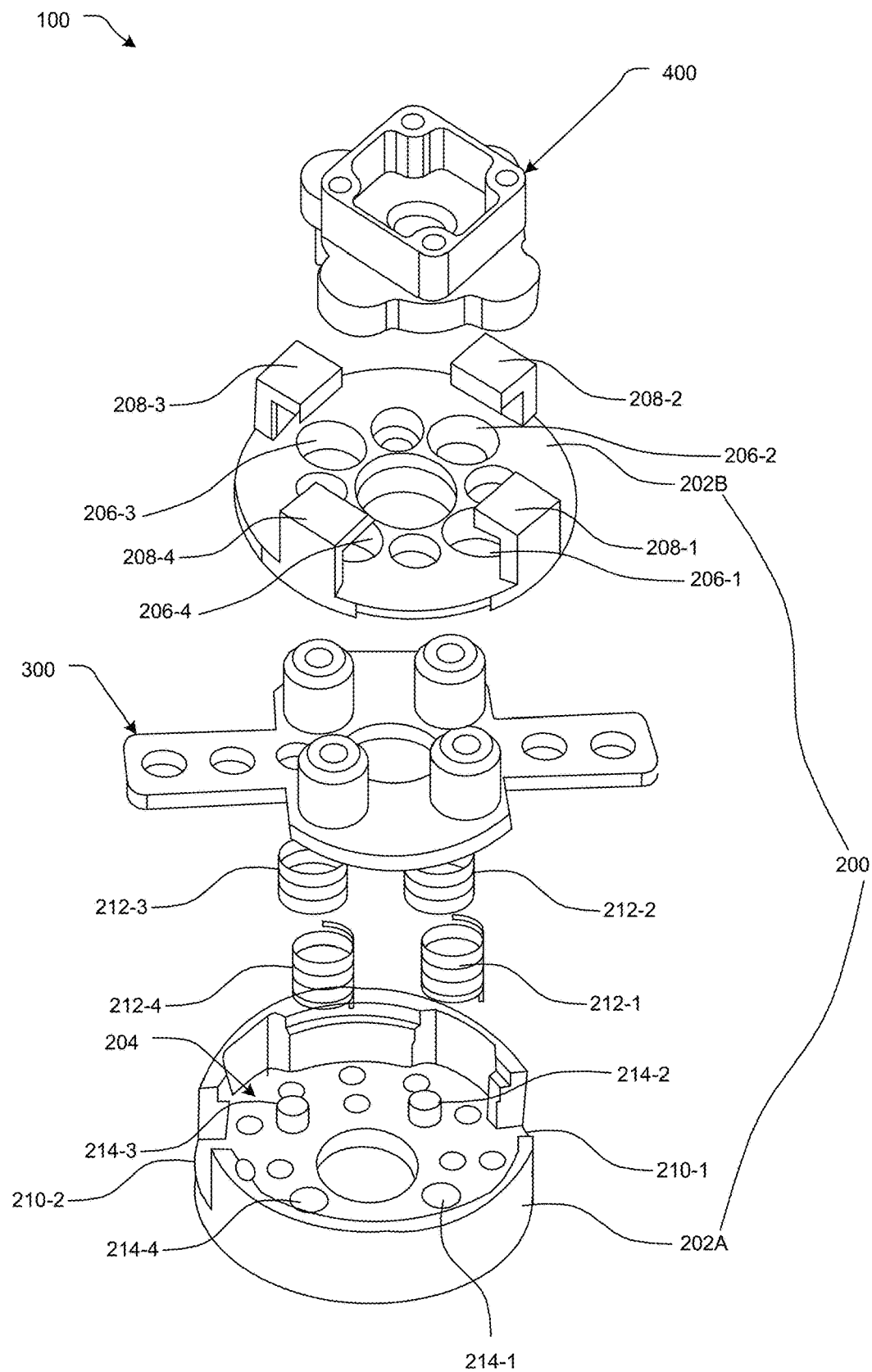
FIG. 1A illustrates an exemplary exploded view of the disclosed connector assembly, as viewed from top side, in accordance with embodiments of the present disclosure.
Figure 1B:
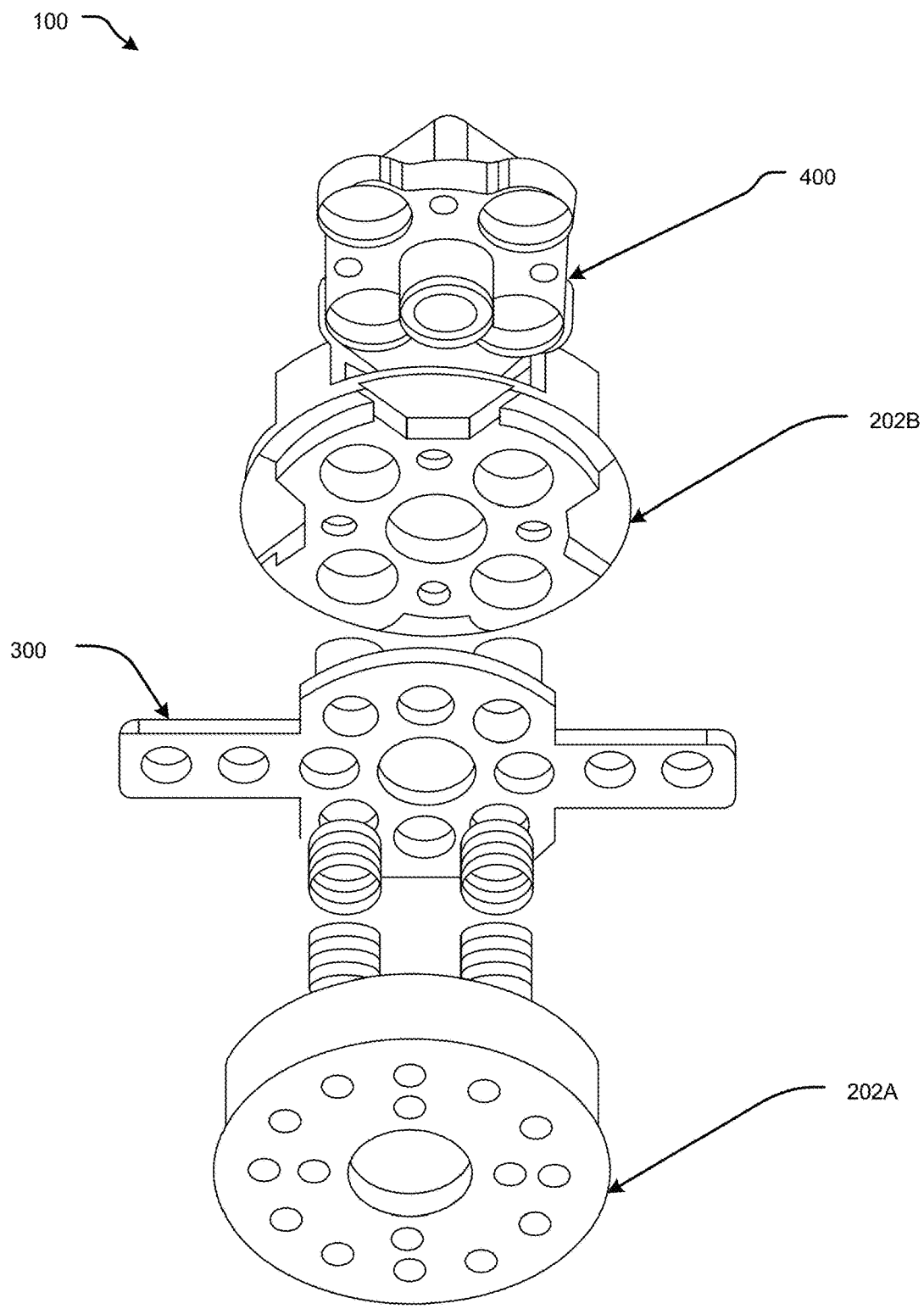
FIG. 1B illustrates another exemplary exploded view of the connector assembly as viewed from a bottom side, in accordance with embodiments of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Embodiments explained herein relate generally to the technical field of unmanned aerial vehicles. In particular, it pertains to an assembly for coupling and decoupling of a propeller unit with the corresponding motors of a UAV without using screws and bolts for quick operation.

In an embodiment, the proposed connector assembly includes a base portion to be fixed to the motor and a holder to be fixed to the corresponding propeller. The holder is configured to be detachably coupled to the base portion. The detachable coupling is facilitated by teeth provided on the holder and corresponding recesses provided on the base portion such that when the holder along with the coupled propeller is rotated after being placed over the upper side of the base portion, the teeth engage with the recesses of the base portion.

In another embodiment, the holder is locked against rotation after it has been rotated to couple the teeth of the holder with the recesses of the base portion. The locking of the holder against rotation is facilitated by an engaging plate provided in an inner hollow of the base portion. The engaging plate is configured to move between a pressed position and a released position, and is biased towards the released position. The engaging plate includes a plurality of projections, which, in the released position of the engaging plate, project out through a plurality of apertures in the base portion on an upper side of the base portion. These projections, in the released position of the engaging plate, engage with a plurality of cavities provided on the holder, in the position of the holder where teeth of the holder are engaged with the recesses of the base portion, to lock the holder against rotation.

In another embodiment, the engaging plate includes a pair of push bars that extend radially out of the base portion through corresponding cut-outs in the base portion, or a ring shaped structure that is positioned around the base portion, such that the push bars or the ring structure is accessible for being used for moving the engaging plate to the pressed position to unlock the holder for rotation during decoupling of the propeller from the motor, or to allow the holder to be placed in position for rotation during coupling of the propeller with the motor.

Referring to FIG. 1A-B and FIG. 2A-B where an exploded view of a connector assembly 100 as viewed from top side and bottom side respectively are shown, the connector assembly 100 for a rotor includes a base portion 200, and engaging plate 300, and a holder 400.

In an embodiment, the base portion 200 can be made of a housing 202-A and a top plate 202-B fixed to an upper side of the housing 202-A. The housing 202-A further includes a pair of cut-outs, such as cut-outs 210-1, 210-2, . . . (individually and collectively referred to as cut-out(s) 210, herein), for the push bars of the engaging plate 300 to project out of the base portion 200, when the engaging plate 300 is placed within an inner hollow 204, where the housing 202-A and the top plate 202-B together define the inner hollow 204 for positioning of the engaging plate 300. A plurality of protrusions, such as protrusions 214-1, 214-2, 214-3, and 214-4 (collectively referred to as protrusions 214, herein) are also configured with the inner surface of the housing 202-A for supporting lower ends of springs 212 acting as biasing element to bias the engaging plate 300 in an upward direction.

In an embodiment, top plate 202-B can include a plurality of apertures, such as apertures 206-1, 206-2, 206-3, and 206-4 (collectively referred to as apertures 206, herein), to allow passing of the projections 302 (refer to FIG. 2A) configured with the engaging plate 300. Further, the upper surface of the top plate 202-B is configured with a plurality of recesses, such as recesses 208-1, 208-2, 208-3, and 208-4 (collectively referred to as recesses 208, herein), for engagement of a plurality of teeth 402 (refer to FIG. 4A) configured with the holder 400.

In an embodiment, engaging plate 300 can include a plurality of projections 302 and a pair of push bars that extend radially out of the base portion 200 through corresponding cut-outs 210 in the housing 202-A, such that the push bars are accessible for being used for moving of the engaging plate 300 to the pressed position.

In an embodiment, the holder 400 can have a plurality of cavities on its lower surface that engage with the projections 302 of the engaging plate 300 when the engaging plate 300 is in the released position and the projections 302 project out from the base portion 200, the engagement of the projections 302 with the cavities prevents rotation of the holder 400 once engaged with the base portion 200 through the teeth 402.

In an embodiment, to assemble the propeller with the motor, the engaging plate 300 is first pushed down to make the projections 302 of the engaging plate 300 retract within the apertures 206 of the top plate 202-B of the base portion 200. Thereafter, the holder 400 duly assembled with the propeller can be placed on top of the base portion 200 such that the plurality of teeth 402 (refer to FIG. 4A) of the holder 400 are aligned with corresponding recesses 208 provided on the upper side of the top plate 202-B of the base portion 200. Thereafter, the holder 400 along with the coupled propeller can be rotated to engage the teeth 402 of the holder 400 with the recesses of the base portion 200. After the holder 400 has been rotated, the engaging plate 300 can be released for the springs 212 to move the engaging plate 300 up resulting in the projections 302 of the engaging plate 300 moving out of the apertures 206 of the top plate 202-B of the base portion 200 and engage with cavities 404 (refer to FIG. 4B) provided on a lower side of the holder 400. The engagement of the projections 302 of the engaging plate 300 with the cavities 404 of the holder 400 locks the holder against rotation and prevents its disengagement from the base portion 200.

Figure 2A:
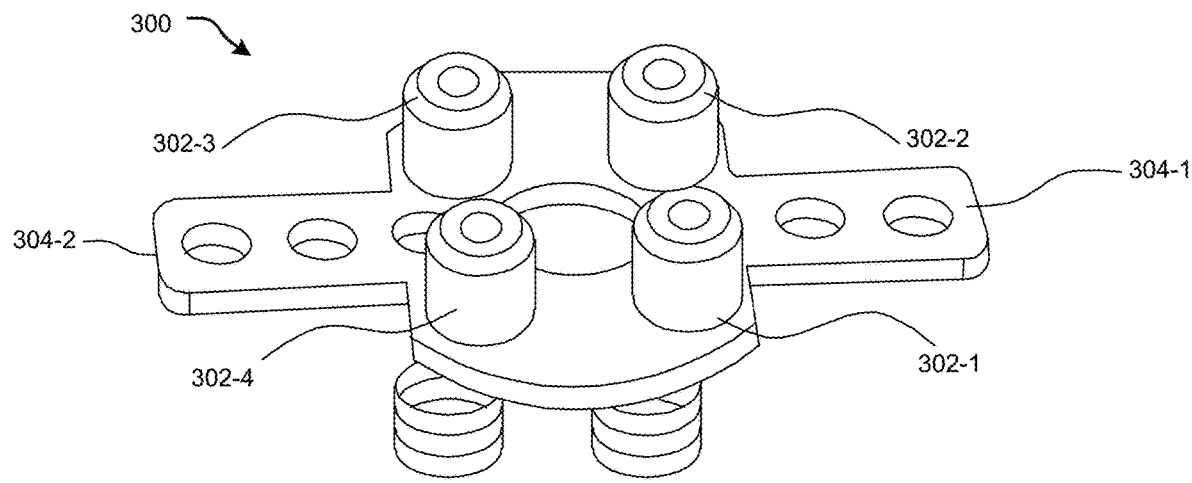
FIG. 2A illustrates an exemplary perspective view of an engaging plate as viewed from top side, in accordance with a first embodiment of the engaging plate.
Figure 2B:
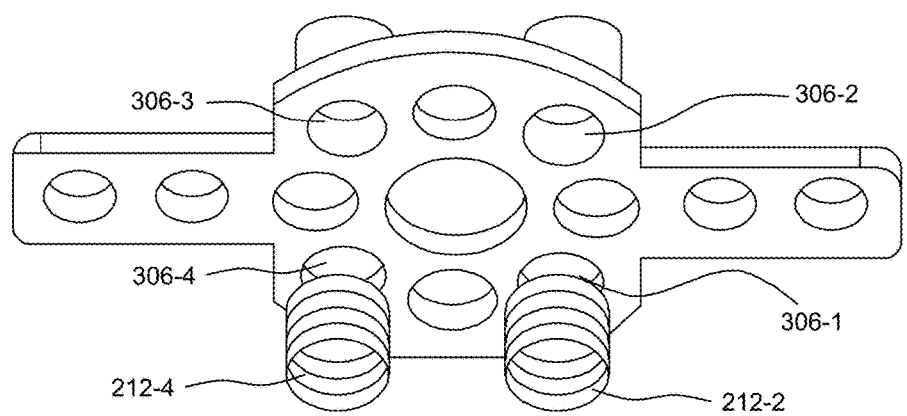
FIG. 2B illustrates another exemplary perspective view of the engaging plate of FIG. 2A as viewed from bottom side, in accordance with the first embodiment of the engaging plate.

FIGS. 2A and 2B illustrate perspective views of an engaging plate 300 as viewed from top side and bottom side respectively, in accordance with a first embodiment. Shown therein are a plurality of projections, such as projections 302-1, 302-2, 302-3, and 302-4 (collectively referred to as projections 302, herein), which, in the released position of the engaging plate 300 project out of the apertures 206 of the top plate 202-B of the base portion 200. Also shown is a pair of push bars 304-1, 304-2 (collectively referred to as push bars 304, herein) that extend radially out of the base portion 200 through corresponding cut-outs 210-1, 210-2 (collectively referred to as cut-outs 210, herein) in the housing 202-A such that the push bars 304 are accessible for being used for moving of the engaging plate 300 to the pressed position.

Also shown in FIG. 2B are a plurality of springs, such as springs 212-1, 212-2, 212-3, and 212-4 (collectively referred to as springs 212, herein) that are configured between the housing 202-A and the engaging plate 300. An upper end of the springs 212 is positioned within a set of respective inner cavities, such as cavities 306-1, 306-2, 306-3 and 306-4 (collectively cavities 306) of the engaging plate 300.

Figure 3:
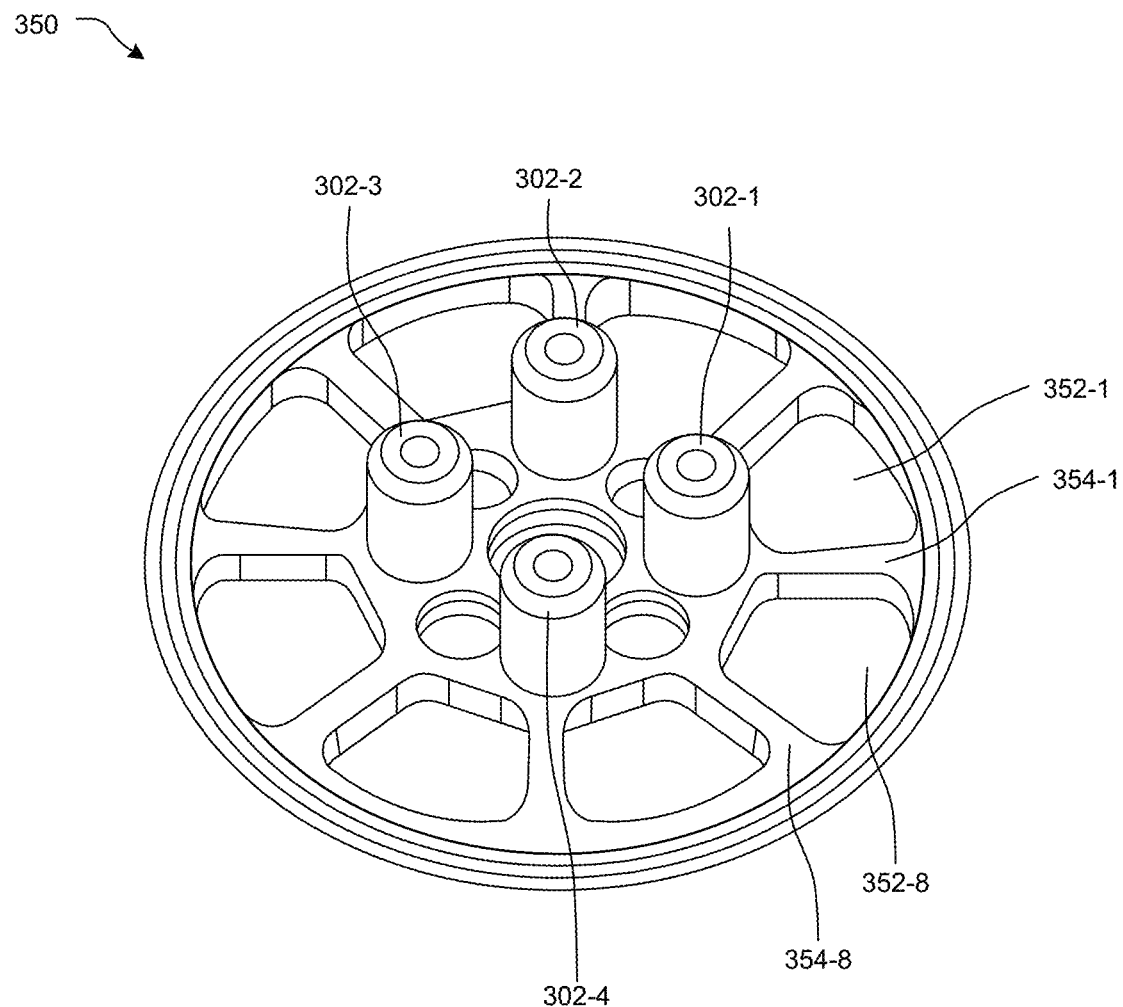
FIG. 3 illustrates an exemplary perspective view of engaging plate as viewed from top side, in accordance with a second embodiment of the engaging plate.

FIG. 3 illustrates a perspective view of an alternate embodiment of the engaging plate 350 as viewed from top side. The engaging plate 350 may be used optionally and includes a circular shape resembling a wheel with solid spokes. The engaging plate 350 is also configured with the plurality of projections 302 similar to the engaging plate 300. The surface of the engaging plate 350 is further configured with a plurality of slots 352-1, 352-2, ..., 352-8 separated through respective spoke arms 354-1, 354-2, ... and 354-8. The housing can include a plurality of cut-outs equal to the number of arms in the engaging plate 350, the arms 352 projecting out through the respective cut-outs.

Figure 4A:
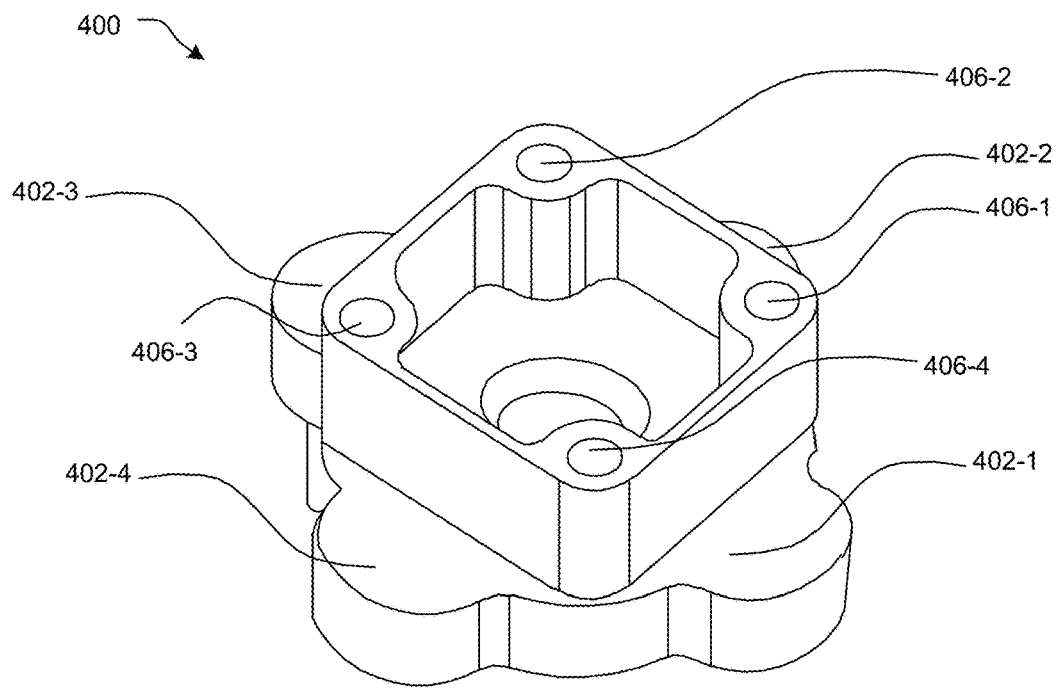
FIG. 4A illustrates an exemplary perspective view of a holder configured with the connector assembly as viewed from a top side, in accordance with the embodiments of the present disclosure.
Figure 4B:
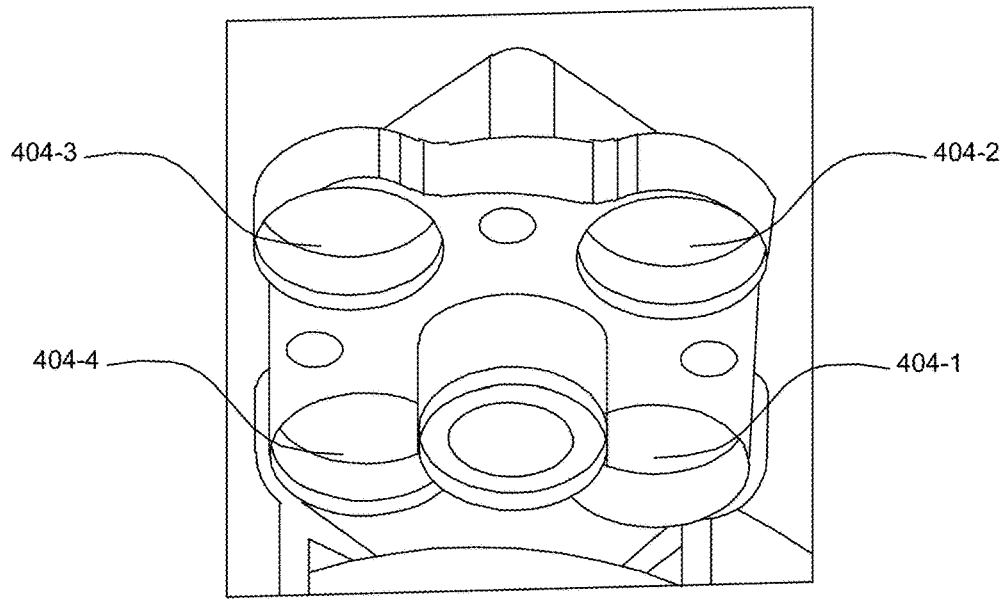
FIG. 4B illustrates another exemplary perspective view of the holder configured with the connector assembly as viewed from a bottom side, in accordance with the embodiments of the present disclosure.

FIGS. 4A and 4B illustrate perspective views of a holder 400 of the connector assembly 100, as viewed from top side and bottom side respectively. The holder 400 is fixed to the propeller, and includes a plurality of teeth, such as teeth 402-1, 402-2, 403-3, and 402-4 (collectively referred to as teeth 402, herein), configured to engage with a plurality of recesses 208 provided on the upper side of the top plate 202-B. The bottom view of the holder in FIG. 4B depicts the plurality of cavities, such as cavities 404-1, 404-2, 404-3, and 404-4 (collectively referred to as cavities 404, herein) for engaging with the corresponding projections 302 of the engaging plate 300, when the projections 302 project out from the apertures 206 of the base portion 200.

In an embodiment, the holder 400 is coupled with the top plate 202-B by the engagement of teeth 402 of the holder 400 with the recesses 208 provided on the top plate 202-B. Further, the propeller can be fixed to the holder 400 using a plurality of screws inserted through a plurality of holes 406-1, 406-2, 406-3, and 406-4.

Figure 5:
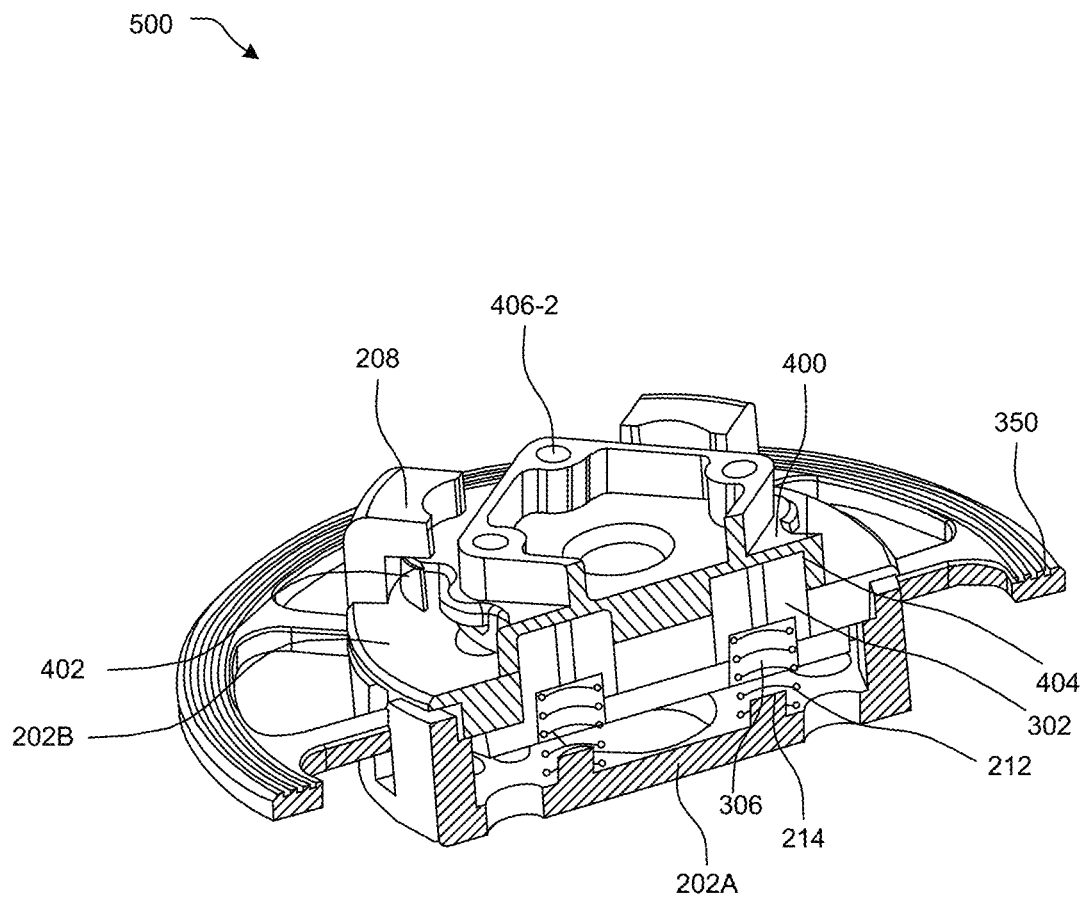
FIG. 5 illustrates an exemplary cross-sectional view of the connector assembly depicting arrangement of different parts of the connector assembly, in accordance with embodiments of the present disclosure.

FIG. 5 illustrates a cross-sectional view 500 of the connector assembly 100 depicting different components of the connector assembly 100 without the propeller, and clearly shows engagement/interaction between different features as described above.

Thus, the present disclosure provides a simple, efficient connecting assembly 100 for coupling and decoupling a propeller unit with the corresponding motor units of an UAV that does not required any screw or bolts and specialised tools or power. The connecting assembly 100 helps to minimize time required for coupling and decoupling the propeller.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Invention

The present disclosure provides a solution to ease assembly and disassembly of an unmanned aerial vehicle.

The present disclosure provides a quick release device for ease of assembly and disassembly of propellers of an unmanned aerial vehicle.

The present disclosure provides a quick release device for propellers of unmanned aerial vehicles that is easy and quick to operate.

The present disclosure provides a simple, efficient, and cost-effective quick release device that does not required any screw or bolts and specialised tools during assembly and disassembly of the propellers.

The present disclosure provides a quick release device with limited parts that does not require any specialised training to technician for coupling and decoupling of a propeller onto a motor of an unmanned aerial vehicle.

The present disclosure provides a quick release device for propellers that ensure proper alignment and a robust coupling of the propeller with the motor.

The present disclosure provides a quick release device for assembly and disassembly of propellers of an unmanned aerial vehicle that helps in reducing packaging space of the unmanned aerial vehicle.

I claim:

1. A connector assembly (100) for a rotor, comprising:

a base portion (200) configured to be fixed to a motor unit;

an engaging plate (300/350) for movement between a pressed position and a released position, the engaging plate (300/350) being biased towards the released position; wherein the engaging plate (300/350) comprises a plurality of projections (302), which, in the released position of the engaging plate (300/350), project out through a plurality of apertures (206) in the base portion (200) on an upper side of the base portion (200); and a holder (400) fixed to a propeller, the holder (400) comprises a plurality of teeth (402) configured to engage with a plurality of recesses (208) provided on the upper side of the base portion (200), when the holder (400) along with the coupled propeller is rotated after being placed over the upper side of the base portion (200);

wherein the holder (400) comprises a plurality of cavities (404) that engage with the projections (302) of the engaging plate (300/350) that project out from the upper side of the base portion (200) on the engaging plate (300/350) moving to the released position, the engagement of the projections (302) with the cavities (404) preventing rotation of the holder (400) after the teeth (402) of the holder (400) have engaged with the recesses (208) of the base portion (200).

2. The connector assembly as claimed in claim 1, wherein the base portion (200) comprises a housing (202-A) and a top plate (202-B) fixed to an upper side of the housing (202-A), wherein the housing (202-A) and the top plate (202-B) together define an inner hollow (204) for accommodating the engaging plate (300/350).

3. The connector assembly as claimed in claim 2, wherein the apertures (206) are provided on the top plate (202-B).

4. The connector assembly as claimed in claim 3, wherein the projections (302) of the engaging plate (300/350) are configured such that, when the engaging plate (300/350) is moved to the pressed position, the plurality of projections (302) are withdrawn within the corresponding apertures (206) to allow the holder (400) to be rotated after being placed over the top plate (202-B).

5. The connector assembly as claimed in claim 2, wherein the engaging plate (300) comprises a pair of push bars (304) that extend radially out of the base portion (200) through corresponding cut-outs (210) in the housing (202-A) below the top plate (202-B), such that the push bars (304) are accessible for being used for moving of the engaging plate (300) to the pressed position.

6. The connector assembly as claimed in claim 2, wherein the engaging plate (300/350) is biased by one or more springs (212) configured between the housing (202-A) and the engaging plate (300/350).

7. The connector assembly as claimed in claim 2, wherein the recesses (208) for engagement of teeth (402) of the holder (400) are provided on the top plate (202-B).

8. The connector assembly as claimed in claim 2, wherein the top plate (202-B) is fixed to the housing (202-A) by screws.

9. The connector assembly as claimed in claim 1, wherein the holder (400) and the base portion (200) comprise holes (406) for fixing a screw there-through as an additional locking between the base portion (200) and the holder (400).

* * * * *